Jan. 3, 1939.   P. LANDROCK   2,142,853
MAGAZINE CONSTRUCTION FOR COPYING CAMERAS
Filed Jan. 14, 1938   4 Sheets-Sheet 1

INVENTOR.
Paul Landrock
BY Cumpston & Shepard
his ATTORNEYS

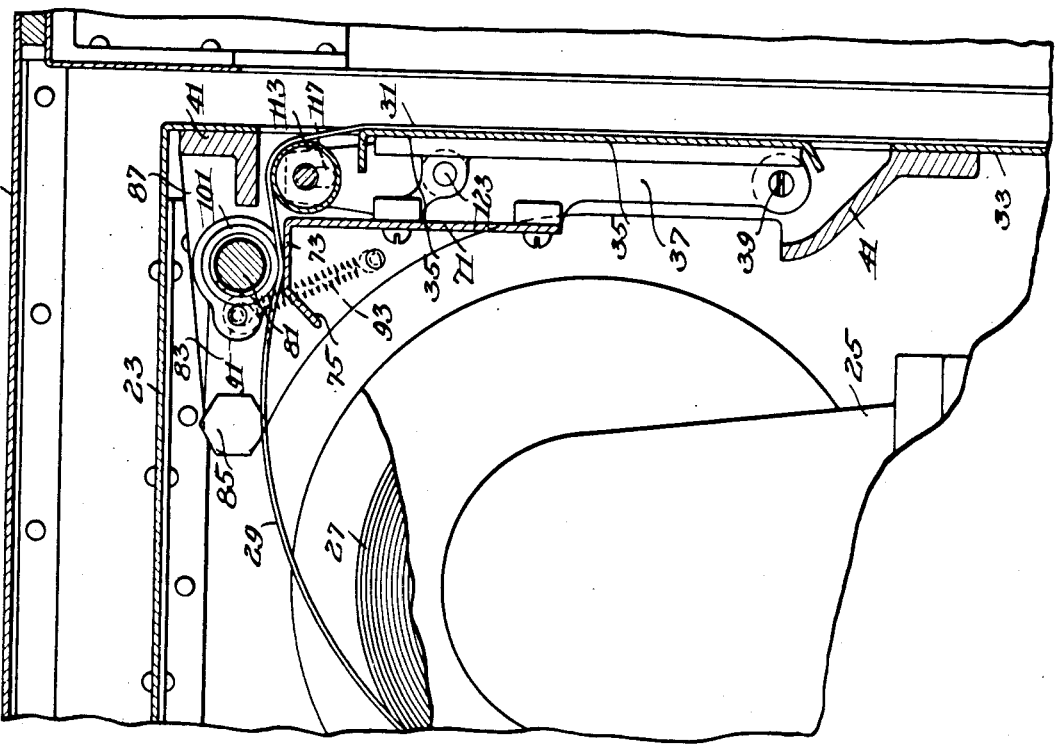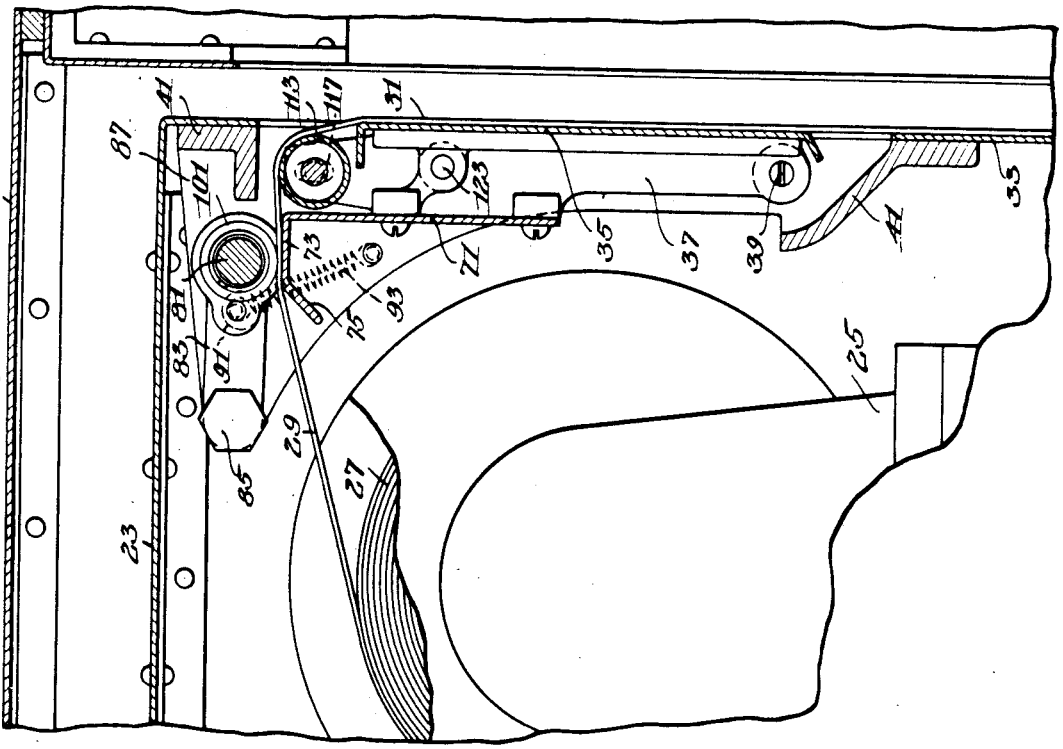

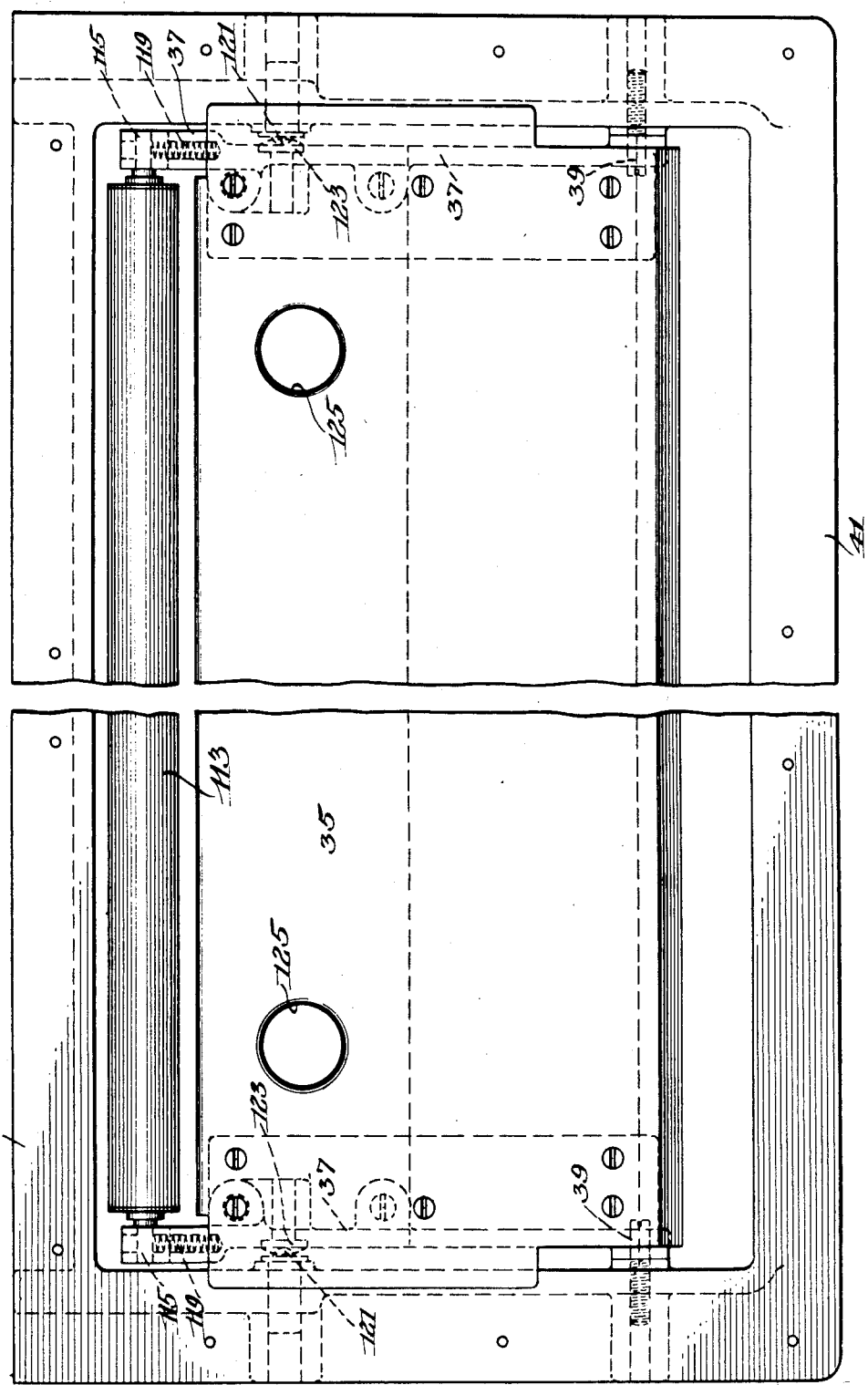

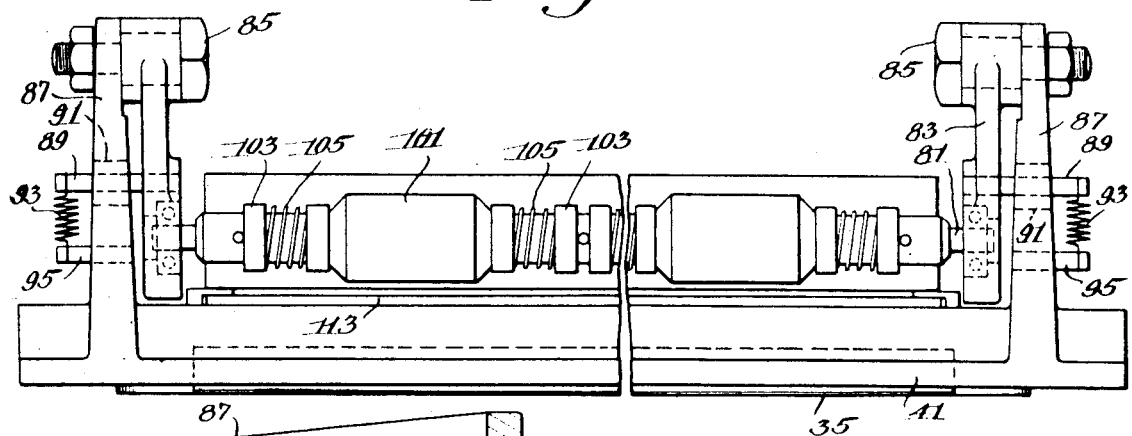
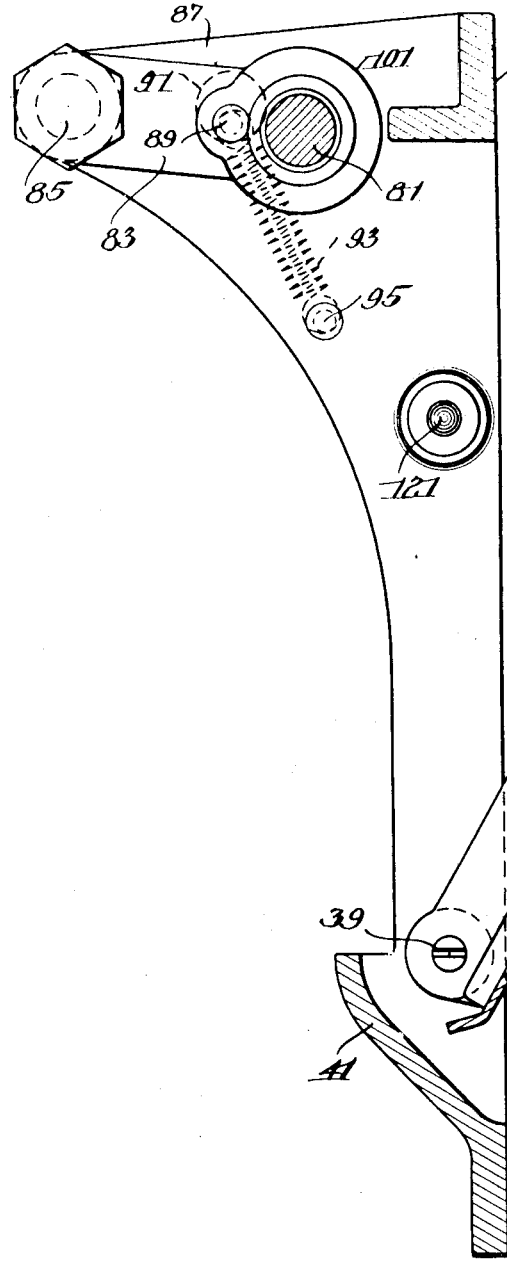
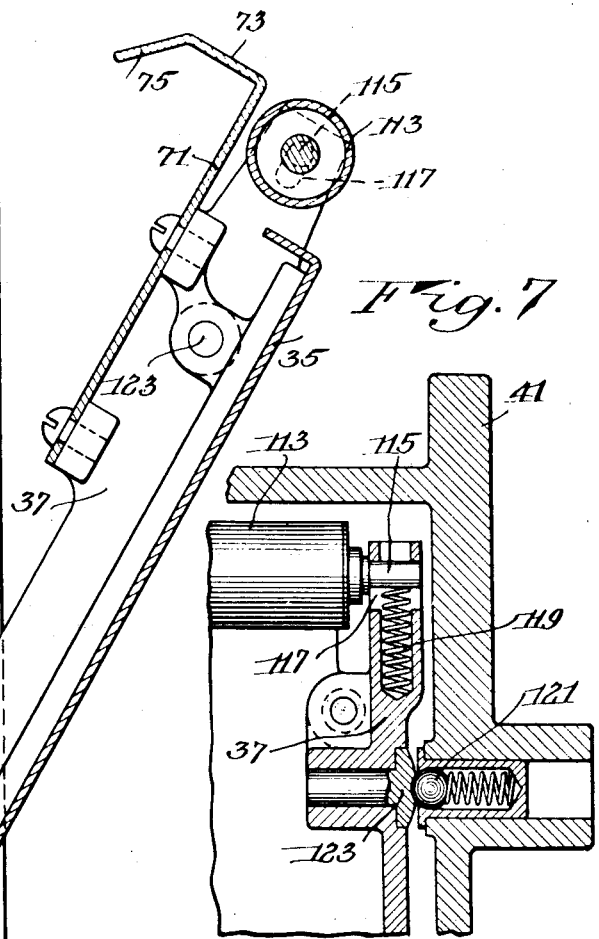

Patented Jan. 3, 1939

2,142,853

UNITED STATES PATENT OFFICE 2,142,853

MAGAZINE CONSTRUCTION FOR COPYING CAMERAS

Paul Landrock, Rochester, N. Y., assignor to Photostat Corporation, Providence, R. I., a corporation of Rhode Island Application January 14, 1938, Serial No. 185,021

11 Claims. (Cl. 271—2.3)

The present invention relates to the construction of film magazines for copying cameras of various kinds, styles, and sizes, such, for example, as the copying cameras widely known under the trade-mark "Photostat" and manufactured by Photostat Corporation, the assignee of this present invention. The present magazine construction is not, however, confined to these cameras and it may be applied to various other kinds of copying cameras, or even to cameras of other types not commonly called "copying cameras."

In copying cameras, the film on which the photographic exposure is made is usually in the form of a web of paper or similar material, photographically sensitized on one or sometimes both surfaces. The sensitized unexposed film is supplied from a roll in the magazine. A portion or expanse of the web is held in the focal plane of the camera while an exposure is made, and the exposed portion is then removed from the focal plane and developed and fixed or otherwise photographically processed, a fresh unexposed portion of the film being brought into the focal plane.

In those types of copying cameras in which the movement of the film is effected by feeding rollers or the like, it sometimes happens that, when the feeding rollers are stopped, the film itself continues to move to some extent, due perhaps to the inertia effect of the moving supply roll of film, or to other causes. This leads to an excess of film in the focal plane of the camera, which causes buckling of the film, with the result that portions thereof do not lie truly in the focal plane but are buckled out of the plane and are, therefore, out of the true focus of the camera, so that the resulting prints may perhaps be blurred or imperfect.

An object of the present invention is to overcome these prior difficulties and to provide a magazine construction in which the film will always be held truly in the focal plane of the camera.

Another object of the invention is the provision of such a construction which is relatively simple and of few parts, inexpensive to manufacture and easy to keep in order.

A further object is the provision, in a film magazine, of means for automatically keeping the film taut in the proper focal plane.

To these and other ends the invention resides in certain improvements and combinations of parts, all as will be hereinafter more fully described, the novel features being pointed out in the claims at the end of the specification.

In the drawings:

Fig. 2 is a similar view of the upper part of Fig. 1, on a larger scale, showing the parts in the position they occupy while the film is being fed;

Fig. 3 is a view similar to Fig. 2 showing the position of the parts when feeding of the film has ceased, the film now being held taut in the focal plane;

Fig. 4 is a front elevation of the upper part of the magazine, with the film removed in order to show parts behind it;

Fig. 5 is a plan of the friction roller and its supporting arms and associated parts of the mechanism;

Fig. 6 is a vertical section through the magazine door and part of its surrounding framework, showing the door in open position, and Fig. 7 is a vertical section through a fragment of the door and its associated framework, with the door closed.

The same reference numerals throughout the several views indicate the same parts.

Figure 1:
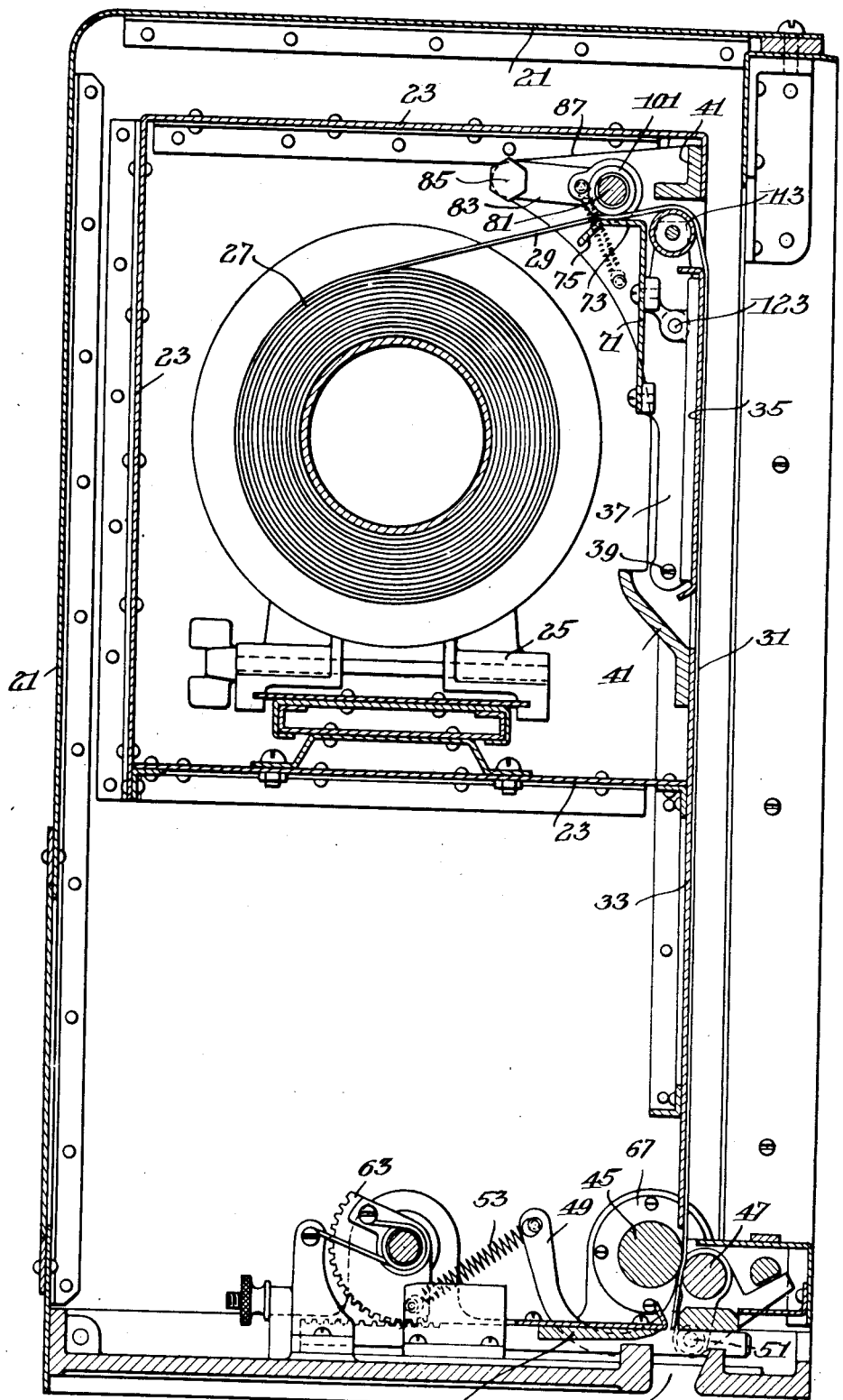
Fig. 1 is a vertical section taken substantially centrally through a film magazine constructed in accordance with a preferred embodiment of the invention.

The magazine is usually hinged or otherwise suitably connected to the rear of the camera body, and comprises walls 21 forming a box-like structure open at the front, this open side being brought against the open rear side of the camera body so that light rays passing through the lens and shutter of the camera will pass rearwardly through the body and into the open front of the magazine, in the usual known manner.

In the upper part of the magazine chamber formed by the walls 21, is a separate and substantially light-tight box or roll holding compartment formed by walls indicated in general at 23. Within this compartment 23 is roll holding means 25 of any suitable known form, for holding a roll 27 of unexposed sensitized film, having an emulsion or photographic coating on one or both surfaces. As the film is needed, it is drawn forwardly from the roll 27 as indicated at 29, and downwardly in the focal plane of the camera as indicated at 31, lying against the front face of the focal plane support, which may be formed by a fixed plate 33 constituting the lower part of the focal plane support and a hinged plate or door 35 forming the upper part of the focal plane support and mounted on frame arms 37 pivoted at 39 to a fixed frame 41.

Upon leaving the bottom of the focal plane support 33, the film 31 passes between feed rollers 45 and 47, the latter mounted on a pair of arms 49 hinged to the casing at 51 and influenced by springs 53 tending to move the roller 47 toward the roller 45 to grip the film 31 between these two rollers. As one or both of the rollers 45 and 47 are turned by any suitable known feeding means, the film strip is fed downwardly through a throat opening 55 in the bottom wall of the magazine, into a developing bath, or a dark chamber, or to a conveyor, or to any other suitable point where the exposed film may be further handled or treated.

By turning the feed rollers to the proper extent, the entire exposed portion of the film 31 may be drawn downwardly out of the focal plane and fed through the opening 55, the feeding operation drawing a fresh unexposed portion from the roll 27 into the focal plane, ready for the next exposure. At the end of the feeding operation the exposed portion of the film may, if desired, be severed from the unexposed portion in known manner, as by operating a reciprocating knife 61 geared to a toothed segment 63 turned in any suitable known manner by the knife operating mechanism.

The feed roller 45 preferably is provided with one-way clutch or brake means within the casing 67, which permits the roller to turn in a direction to feed the film 31 downwardly, but which prevents retrograde motion of the roller.

When the film portion 31 is fed downwardly out of the focal plane, the supply roll 27 necessarily turns and the momentum of this roll may keep it turning for an instant after the feed rollers 45 and 47 have been stopped. Any excess film unwound from the roll 27 is prevented from reaching the focal plane by brake means comprising a plate secured to the inner face of the door frame 37 and extending across substantially the full width of the strip or web of film, this plate having a vertical portion 71 secured to the frame 37, the plate being bent rearwardly at its upper edge to provide a horizontal flange 73 terminating in a downwardly and rearwardly extending oblique flange 75. The strip of film, as it is led forwardly from the roll 27, passes over the portions 73 and 75 of this brake plate, as shown especially in Figs. 1 and 2.

The brake means also comprises brake roller means for pressing on the upper surface of the film as it passes over the brake plate 73, to press it firmly down on the brake plate. The brake roller means is mounted on a shaft 81 extending transversely across substantially the full width of the film strip, the ends of the shaft being mounted in the forward ends of arms 83 pivoted to swing upwardly and downwardly on pivots 85 secured to the rear ends of arms 87 fixed to and extending rearwardly from the frame 41. Pins 89 secured to the swinging arms 83 extend outwardly beyond the fixed arms 87 through holes 91 in the latter, and are connected to the upper ends of tension springs 93, the lower ends of which are secured to pins 95 fixed in the arms 87. When the magazine door 35 is swung forwardly to open position so that the brake plate portions 73 and 75 are removed from beneath the roller means on the shaft 81, the downward motion of the arms 83 and of the shaft is limited by contact of the pins 89 with the bottoms of the holes 91 through which they extend.

The brake roller means on the shaft 81 may consist of a single roller or a plurality of roller sections fixed directly to the shaft, but it is preferred to provide a plurality of independent roller sections movable longitudinally along the shaft through limited ranges of movement, in order that the individual roller sections may accommodate themselves to any warped portions, bulges, or irregularities in the film. As here shown, the brake roller means includes a plurality of roller sections 101 of soft rubber or the like, at intervals along the shaft 81 and independently rotatable thereon. The roller sections are also movable longitudinally along the shaft. Collars 103 are fixed to the shaft at intervals, and coiled springs 105, surrounding the shaft between the rollers 103 and the ends of the roller sections 101, tend to keep the roller sections 101 against longitudinal movement on the shaft but permit these sections to move along the shaft in either direction through a limited range, in order that they may run truly on the film without any side slipping between the film and the roller.

The brake means comprising the brake plate 73 and the brake rollers 101 acts as a friction brake resisting movement of the film past the brake. The feeding action of the feed rollers 45 and 47 pulls the film through the brake, of course, but the brake exerts such a degree of frictional force on the film that the movement of the film past the brake stops instantly when the feeding rollers stop. Thus no excess film is delivered to the focal plane. If, due to momentum, the film supply roll 27 continues to turn after the feeding rollers stop, the excess film unwound from the supply roll will simply buckle in the roll box, behind the brake 73, 101, such buckling of excess film being illustrated in Fig. 3. Of course, at the next feeding operation, the buckled excess film will be drawn forwardly through the brake, and used up before the roll 27 begins to turn.

The upper side of the film strip as it passes over the brake plate 73 corresponds to the front side when it lies in the position 31 in the focal plane, and is the side coated with emulsion to receive the photographic image. In most cases, the film is coated only on this one side, and it is noted that the emulsion side contacts with the rollers 101, which roll smoothly over the film without in any way damaging the emulsion. It is only the back or uncoated side of the film which slides frictionally over the brake plate 73, and this sliding does not come in contact with and cannot hurt the emulsion. Where, for special purposes, the film is to be coated on both sides, as for use in a duplex camera, then the brake plate 73 may be made of non-tarnishing and high polished material, being extremely smooth so that it will not scratch or mar the emulsion coating on that side of the duplex film which is against the brake plate.

The above mentioned brake means is in many cases sufficient to guard against supplying excess film to the focal plane, and to insure that the film in the focal plane will lie smooth and true therein in a manner superior to prior known constructions. As an extra precaution, however, to make doubly sure of this desirable result, and to increase the certainty that the film in the focal plane will lie smooth and true, the present invention provides tensioning means for actually tensioning or pulling taut the expanse of film between the brake means 73, 101, and the feed rollers 45, 47. This tensioning means can be placed above or below the upper and lower limits, respectively, of the photographic area of the focal plane; that is, it may be placed between the brake means 73, 101 and the upper limit of the focal plane, or between the lower limit of the focal plane and the feed rollers 45, 47. In the present instance, it is preferred to place the tensioning means between the brake means and the upper limit of the focal plane.

In the illustrative example here disclosed, this film tensioning means comprises a roller 113 over and around part of the periphery of which the film passes between the brake means and the upper edge of the focal plane support section 35, the roller extending substantially across the full width of the film strip. The roller 113, having a coating of soft rubber or other suitable material to contact with the film strip without damaging it, is mounted on trunnions 115 (see especially Fig. 7) which are slidable upwardly and downwardly in slots 117 formed in the frame 37 of the roll holder door 35. Coiled springs 119 mounted in bores in the frame 37 beneath the trunnions 115, constantly press upwardly on these trunnions and tend to elevate them to their upward limit of movement determined by contact with the upper ends of the slots 117.

Wherever the tensioning device may be located, whether above or below the limits of the focal plane, the slots 117 in which the trunnions 115 are mounted extend in a direction such that when the film strip is placed under tension, this tension tends to move the tensioning roller 113 along the slots 117 in a direction to compress the springs 119. In the present illustrative example, the slots 117 are arranged substantially vertically when the roll box door 35 is closed. With the parts in the normal relative positions shown in Figs. 1 and 2, it is seen that tension produced on the section of film between the brake means and the feeding rollers will produce a force tending to displace the roller 113, this force having a component in a direction extending downwardly along the slots 117 in which the roller trunnions are mounted. Consequently, when the feed rollers 45, 47 are operated, the action of the brake 73, 101 on the film strip produces a substantial tension in the film strip between the brake and the feed rollers, and this tension displaces the tensioning roller 113 downwardly along the slots 117, compressing the springs 119. The position of the parts with the roller 113 thus displaced while the film is being fed, is illustrated in Fig. 2. Then when the feeding operation ceases, the force of the springs 119 constantly tends to restore the tensioning roller 113 to its upper limit of motion, and this keeps the portion of film 31 in the focal plane under the desired tension at all times, causing it to lie smooth and true, so that all parts of the photographic image will be properly focused thereon. Even if the film strip should to some extent creep upwardly through the feeding rollers 45, 47, or creep forwardly through the frictional brake 73, 101, such creeping of the film would not result in loosening the film in the focal plane or cause buckling thereof, for the springs 119 would simply be able to move the tensioning roller 113 slightly upwardly along the slots 117, to take up any looseness in the film caused by such creeping, thus maintaining the film taut in the focal plane. This position of the parts is illustrated in Fig. 3, which shows some excess film piled up or buckled between the supply roll 21 and the frictional brake 73, 101, and which shows also the tensioning roller 113 moved somewhat upwardly from the position shown in Fig. 2, in order to take up any looseness in the film and hold it taut.

When the roll holder door 35 is closed, it is frictionally held in this closed position, in known manner, by means of a spring-pressed ball 121 mounted in the stationary frame at the side of the door, seating in a cavity in a hardened plug 123 mounted in the door, as shown in Fig. 7. A simple forward pull, on the upper part of the door, as by hooking one's fingers through the holes 125 (Fig. 4) is sufficient to overcome the holding effect of the ball 121 and open the door forwardly and downwardly. This opening takes place, of course, when the film supply is exhausted, in order to place a fresh roll of film in the film box 23 of the magazine.

One of the merits of the present invention is that the brake and tensioning means require no special attention on the part of the operator, and in fact no special knowledge of their existence on his part. The film is threaded through the apparatus just as in the case of prior commercial cameras not equipped with this invention, and the operator need not even know that the camera is equipped with this brake and tensioning means, since the brake and tensioning means will function automatically without any special action by the operator. In threading a fresh supply of film into the machine, the magazine is opened up as usual by moving it away from the camera body, the operator thus obtaining access to the front side of the focal plane support. The film box door 35 is then opened as usual, and the new roll of film is placed therein. The end of the film is led forwardly from the roll, over the upper edge of the open door 35.

While the door is open, the springs 93 pull the brake rollers 101 downwardly until the pins 89 rest on the bottoms of the holes 91, this position being shown in Fig. 6. Then when the door 35 is closed, the inclined or oblique section 75 of the brake plate will, in closing, automatically force the brake rollers 101 upwardly so that they will ride on top of that portion of the film strip which rests on the brake plate portion 73.

When the door is closed, the operator grasps the end of the film strip which has been left hanging loose over the upper edge of the door, and pulls it downwardly to the bottom of the focal plane and feeds it through the feed rollers 45, 47 in the usual known manner. The magazine is then brought into proper cooperation with the camera body, and the camera is ready for making exposures, the brake and tensioning means of the present invention operating automatically to keep the film in the focal plane properly tensioned under all normal conditions of use.

The strength of the springs 119 is so chosen with respect to the strength of the springs 93, that the springs 119 and tensioning roller 113 will produce less tension in the film strip than the tension required to pull it through the brake 73, 101. The feed rollers 45, 47 grip the film with greater force than that required to pull it through the brake. While the feed rollers are operating to pull the film through the brake, the tension in the film is sufficient to depress the tension roller 113 and compress the springs 119, and when the feeding is completed the force of the compressed springs 119 will keep the film tensioned, but not to such a degree as to pull additional film through the brake.

While one embodiment of the invention has been disclosed, it is to be understood that the inventive idea may be carried out in a number of ways. This application is therefore not to be limited to the precise details described, but is intended to cover all variations and modifications thereof falling within the spirit of the invention or the scope of the appended claims.

I claim:

1. Film handling means for photographic cameras, including a focal plane on which photographic images are focussed, means for holding a supply of film, said supply holding means including a box having a movable door, feeding roller means for drawing film from said supply to said focal plane and across said focal plane in position to be exposed, said roller means tending to prevent reverse motion of said film, frictional brake means acting on said film between said supply and said focal plane and tending to prevent forward motion of said film, said brake means including a stationary member in contact with one surface of the film and means in contact with the opposite surface of the film for pressing said film resiliently against said stationary member, and tensioning means mounted on and movable bodily with said door and acting on said film between said brake means and said feeding roller means to tension said film to hold it taut in said focal plane.

2. Film handling means for photographic cameras, including a focal plane on which photographic images are focussed, means for holding a supply of film, said supply holding means including a box having a movable door, feeding roller means for drawing film from said supply to said focal plane and across said focal plane in position to be exposed, said roller means tending to prevent reverse motion of said film, frictional brake means acting on said film between said supply and said focal plane and tending to prevent forward motion of said film, said brake means including a stationary member in contact with one surface of the film and means in contact with the opposite surface of the film for pressing said film resiliently against said stationary member, and tensioning means mounted on and movable bodily with said door and acting on said film between said brake means and said focal plane to tension said film to hold it taut in said focal plane.

3. Film handling means for photographic cameras, including means for holding a supply of film, focal plane support means on which film may be stretched in position to be exposed, said support means including a pivoted door which may be opened to obtain access to said film supply holding means, a plate mounted on and movable with said door and located in a position so that film moved from said supply to said focal plane support means will pass in contact with said p'ate, said plate extending in a general direction approximately perpendicular to a radial line extending from the pivotal axis of said door to said plate, roller means mounted for movement toward and away from said plate and in a general direction approximately toward and away from said pivotal axis when said door is closed, said roller means being on the opposite side of said film from said plate, and means tending to press said roller means toward said plate, so that said roller means will press said film against said plate and thus form a frictional brake resisting movement of said film.

4. Film handling means for photographic cameras, including means for holding a supply of film, focal plane support means on which film may be stretched in position to be exposed, said support means including a pivoted door which may be opened to obtain access to said film supply holding means, roller means mounted on said door near the edge thereof remote from the pivotal axis of the door, said roller means being so positioned that film moved from said supply to said focal plane support means will lie against and pass partially around said roller means, said roller means being mounted for bodily movement with respect to said door in a direction transverse to its rotary axis, and means tending to move said roller means bodily in a direction against the film passing therearound.

5. Film handling means for photographic cameras, including means forming a focal plane exposure area in position to have an expanse of film placed thereacross, means for holding said film beyond two opposite edges of said exposure area in such manner as to resist movement of the film from the holding points toward said exposure area, rotatable roller means mounted for bodily movement through a limited range in a direction transverse to its rotary axis, and resilient means tending to move said roller means bodily toward one end of its range of movement, said roller means contacting with said film at a point between said two holding points and being so positioned that tension in said film acts upon said roller means with a force having a component tending to displace said roller means against the force of said resilient means, the resulting pressure of said roller means against said film serving to hold said film taut in said exposure area.

6. Film handling means for photographic cameras, including means forming a focal plane exposure area, means for holding a supply of film in position to be supplied to said area adjacent one edge thereof, film feeding roller means beyond an opposite edge of said exposure area, said feeding roller means being effective to draw film from said supply to said exposure area and across said area in position to be exposed and to hold said film against reverse movement, brake plate means over which said film slides as it is drawn from said supply to said area, brake roller means on the opposite surface of the film from said plate means, means tending to move said brake roller means toward said brake plate means to press said film against said plate means and thereby create a substantial frictional drag tending to resist feeding movement of said film from said brake plate means toward said exposure area, rotatable tensioning roller means contacting with said film between said brake plate means and said feeding roller means, said tensioning roller means being mounted for bodily movement transverse to its rotary axis in a direction tending to displace said film and place it under tension between said brake plate means and said feeding roller means so that it will lie flat and true in said exposure area, and resilient means tending to move said tensioning roller means bodily in said direction to tension said film.

7. A construction as described in claim 6, in which said resilient means is of such strength as to exert less tensioning force on said film than the force necessary to draw said film past said brake plate means and brake roller means.

8. A construction as described in claim 6, in which said focal plane exposure area is formed in part by a pivoted door movable to an open position to obtain access to said supply of film, and in which said brake plate means is mounted on and movable bodily with said door.

9. A construction as described in claim 6, in which said focal plane exposure area is formed in part by a pivoted door movable to an open position to obtain access to said supply of film, and in which said tensioning roller means is mounted on and movable bodily with said door.

10. A construction as described in claim 6, in which said focal plane exposure area is formed in part by a pivoted door movable to an open position to obtain access to said supply of film, and in which said tensioning roller means is mounted on and movable bodily with said door and in which the bodily transverse movements of said tensioning roller means take place in a direction approximately parallel to said focal plane exposure area.

11. A construction as described in claim 6, in which said focal plane exposure area is formed in part by a pivoted door movable to an open position to obtain access to said supply of film, and in which both said brake plate means and said tensioning roller means are mounted on and movable bodily with said door.

PAUL LANDROCK.